United States Patent
Shimokawa et al.

(10) Patent No.: US 9,102,852 B2
(45) Date of Patent: Aug. 11, 2015

(54) PRESSURE-SENSITIVE ADHESIVE LAYER, PRESSURE-SENSITIVE ADHESIVE FILM, AND OPTICAL DEVICE

(75) Inventors: Kayo Shimokawa, Osaka (JP); Kenichi Okada, Osaka (JP); Toshitaka Takahashi, Osaka (JP); Yoshiaki Kitani, Osaka (JP); Taiki Shimokuri, Osaka (JP); Yousuke Makihata, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 287 days.

(21) Appl. No.: 13/805,957

(22) PCT Filed: Jun. 20, 2011

(86) PCT No.: PCT/JP2011/064001
§ 371 (c)(1),
(2), (4) Date: Dec. 20, 2012

(87) PCT Pub. No.: WO2011/162191
PCT Pub. Date: Dec. 29, 2011

(65) Prior Publication Data
US 2013/0095298 A1 Apr. 18, 2013

(30) Foreign Application Priority Data

Jun. 22, 2010 (JP) .................................. 2010-141446
Jun. 13, 2011 (JP) .................................. 2011-131207

(51) Int. Cl.
*B32B 3/00* (2006.01)
*B32B 7/12* (2006.01)
(Continued)

(52) U.S. Cl.
CPC .............. *C09J 7/0207* (2013.01); *C09J 7/0246* (2013.01); *C09J 133/04* (2013.01); *G02B 5/00* (2013.01);
(Continued)

(58) Field of Classification Search
CPC .......... B32B 3/00; B32B 3/30; C08L 2201/50; C09J 133/04; C09J 2201/622; C09J 2203/318; C09J 2433/00; C09J 7/0207; C09J 7/0246; Y10T 428/24479; Y10T 428/24612
USPC ....... 428/172, 343, 355 R, 355 AC, 156, 141, 428/40.1
See application file for complete search history.

(56) References Cited

U.S. PATENT DOCUMENTS

2009/0123718 A1  5/2009  Ogasawara et al.

FOREIGN PATENT DOCUMENTS

| JP | 2001-240819 A | 9/2001 |
| JP | 2002-155157 A | 5/2002 |

(Continued)

OTHER PUBLICATIONS

Chinese Notification of First Office Action, issued by SIPO on Jul. 19, 2013 in connection with corresponding Chinese Patent Application No. 201180031331.6.
(Continued)

*Primary Examiner* — Catherine A Simone
(74) *Attorney, Agent, or Firm* — Jean C. Edwards, Esq.; Edwards Neils PLLC

(57) ABSTRACT

A pressure-sensitive adhesive layer is obtained by applying and drying an aqueous dispersion type pressure-sensitive adhesive composition. On a surface of the pressure-sensitive adhesive layer, the number of a concave portion having a depth in a thickness direction of 0.2 to 20 μm and a maximum length along the surface of 1 to 10 mm is 5 or less per 1 m².

9 Claims, 7 Drawing Sheets

(51) Int. Cl.
*C09J 7/02* (2006.01)
*C09J 133/04* (2006.01)
*G02B 5/00* (2006.01)

(52) U.S. Cl.
CPC ........ *C08L 2201/50* (2013.01); *C09J 2201/622* (2013.01); *C09J 2203/318* (2013.01); *C09J 2433/00* (2013.01); *Y10T 428/24479* (2015.01); *Y10T 428/24612* (2015.01)

(56) References Cited

FOREIGN PATENT DOCUMENTS

| | | |
|---|---|---|
| JP | 2004-269699 A | 9/2004 |
| JP | 2005-154689 A | 6/2005 |
| JP | 2005-194448 A | 7/2005 |
| JP | 2007-248485 A | 9/2007 |

OTHER PUBLICATIONS

Chinese Third Office Action issued by SIPO on Sep. 2, 2014 in connection with corresponding Chinese Patent Application No. 201180031331.6.

Notice of Preliminary Rejection issued on Mar. 27, 2014 by Korean Intellectual Property Office in connection with corresponding Korean Patent Application No. 10-2012-7033425.

Notice of Second Office Action issued on May 4, 2014 by SIPO in connection with corresponding CN201180031331.6.

Notification of Reasons for Refusal, issued by the Japanese Patent Office on Jun. 16, 2015, in connection with Japanese Patent Application No. 2011-131207.

FIG.1
(a) 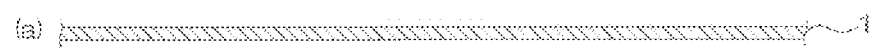
(b) 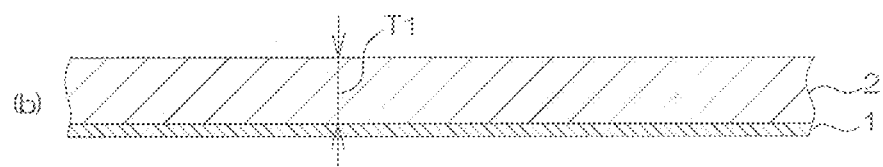
(c) 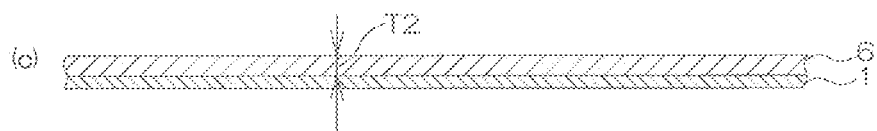

FIG.5
(a)
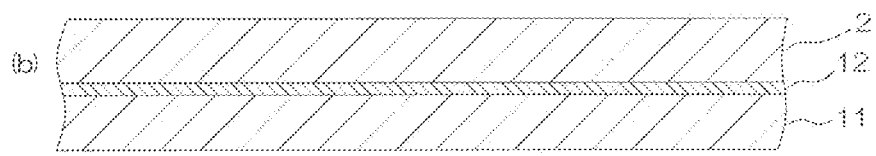
(b)
(c)

Example 1

US 9,102,852 B2

PRESSURE-SENSITIVE ADHESIVE LAYER, PRESSURE-SENSITIVE ADHESIVE FILM, AND OPTICAL DEVICE

CROSS-REFERENCE TO RELATED APPLICATIONS

The present invention is a 35 U.S.C. 371 National Stage Entry of PCT/JP2011/064001, filed Jun. 20, 2011, which claims priority from Japanese Patent Application Nos. 2010-141446, filed on Jun. 22, 2010, and 2011-131207, filed on Jun. 13, 2011, the contents of all of which are herein incorporated by reference.

TECHNICAL FIELD

The present invention relates to a pressure-sensitive adhesive layer, a pressure-sensitive adhesive film, and an optical device, to be specific, to an optical device, and a pressure-sensitive adhesive layer and a pressure-sensitive adhesive film which are preferably used in the optical device.

BACKGROUND ART

Conventionally, a pressure-sensitive adhesive film has been widely used in various industrial fields and has been obtained by providing a pressure-sensitive adhesive layer on the surface of a substrate.

For example, it has been proposed that an aqueous dispersion type pressure-sensitive adhesive composition having a concentration of solid content of 47 weight % obtained by adding an acrylic thickener to an emulsion of an acrylic copolymer is applied onto a release film to be thereafter dried, so that a pressure-sensitive adhesive layer is obtained (ref: for example, the following Patent Document 1).

PRIOR ART DOCUMENT

Patent Document

Patent Document 1: Japanese Unexamined Patent Publication No. 2007-248485

SUMMARY OF THE INVENTION

Problems to be Solved by the Invention

However, in some industrial fields such as the optical industry, there may be a case where an excellent appearance is required in the pressure-sensitive adhesive layer. However, in the pressure-sensitive adhesive layer in the above-described Patent Document 1, such an excellent appearance may not be obtained.

It is an object of the present invention to provide a pressure-sensitive adhesive layer having an excellent appearance, a pressure-sensitive adhesive film and an optical device which include the pressure-sensitive adhesive layer.

Solution to the Problems

A pressure-sensitive adhesive layer of the present invention is obtained by applying and drying an aqueous dispersion type pressure-sensitive adhesive composition, wherein on a surface of the pressure-sensitive adhesive layer, the number of a concave portion having a depth in a thickness direction of 0.2 to 20 μm and a maximum length along the surface of 1 to 10 mm is 5 or less per 1 m².

In the pressure-sensitive adhesive layer of the present invention, it is preferable that the concentration of solid content of the aqueous dispersion type pressure-sensitive adhesive composition is 5 to 32 weight % and the thickness of the pressure-sensitive adhesive layer is 3 to 100 μm.

In the pressure-sensitive adhesive layer of the present invention, it is preferable that the pressure-sensitive adhesive layer contains an aqueous dispersion type acrylic polymer and a thickener, and the viscosity of the aqueous dispersion type pressure-sensitive adhesive composition at 30° C. and a shear rate of 1 sec$^{-1}$ is 0.1 to 50 Pa·s.

In the pressure-sensitive adhesive layer of the present invention, it is preferable that the thickener is prepared as an aqueous solution of 1 weight % and furthermore, when a pH of the thickener is adjusted to be 8, the turbidity is 100 NTU or less.

In the pressure-sensitive adhesive layer of the present invention, it is preferable that the haze value of the pressure-sensitive adhesive layer having a thickness of 23 μm is 1.0% or less.

A pressure-sensitive adhesive film of the present invention includes a substrate and a pressure-sensitive adhesive layer laminated on a surface of the substrate, wherein the pressure-sensitive adhesive layer is obtained by applying and drying an aqueous dispersion type pressure-sensitive adhesive composition, and on the surface of the pressure-sensitive adhesive layer, the number of a concave portion having a depth in a thickness direction of 0.2 to 20 μm and a maximum length along the surface of 1 to 10 mm is 5 or less per 1 m².

In the pressure-sensitive adhesive film of the present invention, it is preferable that the substrate is an optical film.

An optical device of the present invention includes an optical film and a pressure-sensitive adhesive layer laminated on a surface of the optical film, wherein the pressure-sensitive adhesive layer is obtained by applying and drying an aqueous dispersion type pressure-sensitive adhesive composition, and on the surface of the pressure-sensitive adhesive layer, the number of a concave portion having a depth in a thickness direction of 0.2 to 20 μm and a maximum length along the surface of 1 to 10 mm is 5 or less per 1 m².

Effect of the Invention

The pressure-sensitive adhesive layer of the present invention has an excellent appearance and the pressure-sensitive adhesive film of the present invention including the pressure-sensitive adhesive layer is, as a film having an excellent appearance, used for various industrial uses.

Among all, the optical device of the present invention including the above-described pressure-sensitive adhesive film of the present invention can ensure excellent optical characteristics.

BRIEF DESCRIPTION OF THE DRAWINGS

FIG. 1 shows process drawings for illustrating a method for producing one embodiment of a pressure-sensitive adhesive layer of the present invention:

(a) illustrating a step of preparing a release film, (b) illustrating a step of forming a coating liquid layer prepared from an aqueous dispersion type pressure-sensitive adhesive composition on the surface of the release film, and (c) illustrating a step of drying the coating liquid layer to form the pressure-sensitive adhesive layer.

Figure 2:
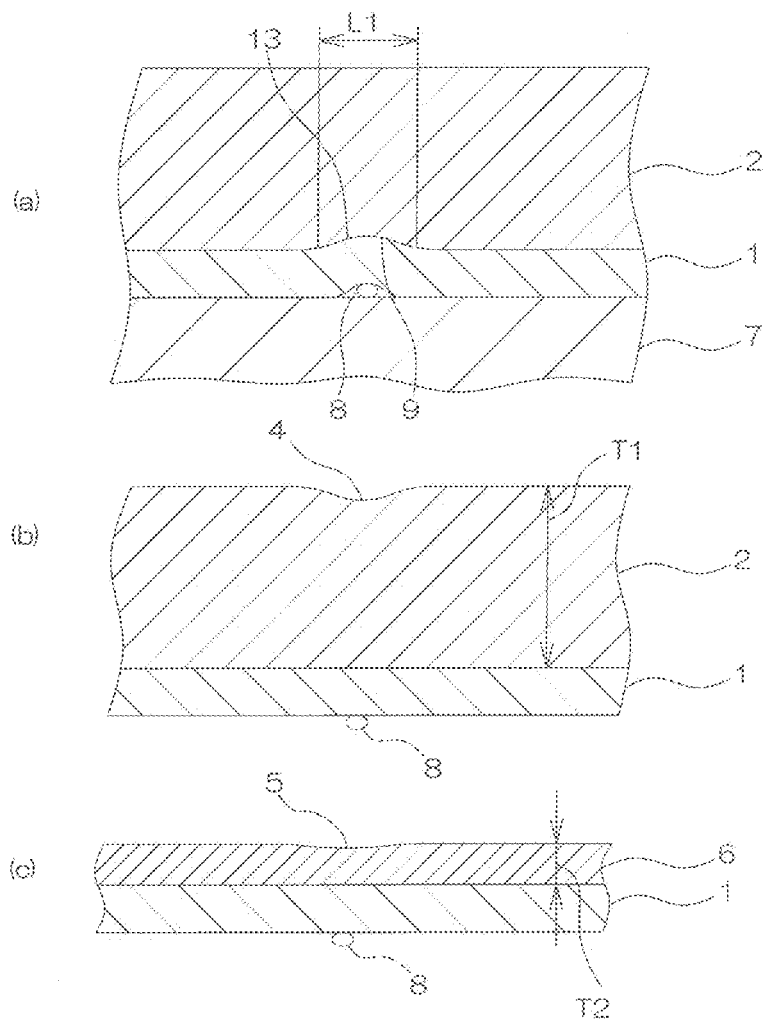

FIG. 2 shows process drawings for illustrating a method for producing a pressure-sensitive adhesive layer in Example 1 in the case where a foreign object is present between the back surface of a release film and the surface of a supporting member:

(a) illustrating a step of forming a coating liquid layer on the surface of the release film in which the foreign object is present on the back surface thereof, (b) illustrating a step of allowing the release film to be separated from the supporting member, and (c) illustrating a step of drying the coating liquid layer to form the pressure-sensitive adhesive layer.

Figure 3:
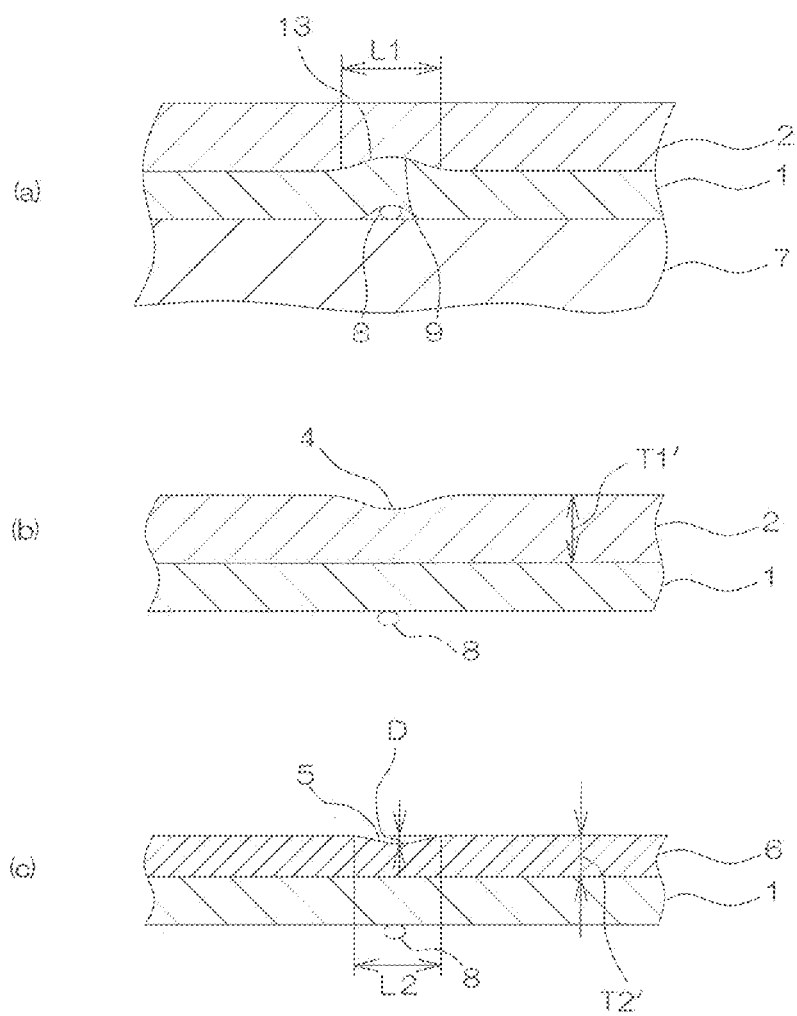

FIG. 3 shows process drawings for illustrating a method for producing a pressure-sensitive adhesive layer in Comparative Example 1 in the case where a foreign object is present between the back surface of a release film and the surface of a supporting member:

(a) illustrating a step of forming a coating liquid layer on the surface of the release film in which the foreign object is present on the back surface thereof, (b) illustrating a step of allowing the release film to be separated from the supporting member, and (c) illustrating a step of drying the coating liquid layer to form the pressure-sensitive adhesive layer.

Figure 4:
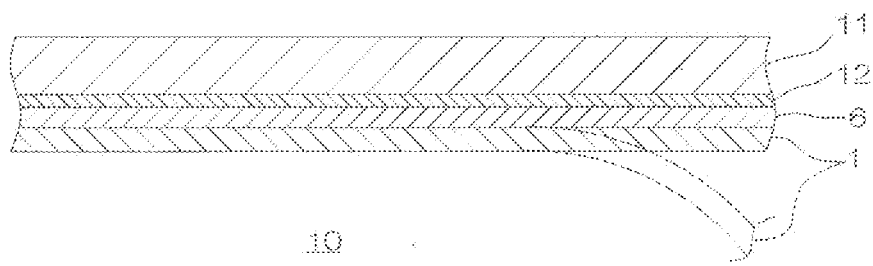

FIG. 4 shows a sectional view of a pressure-sensitive adhesive optical film which is one embodiment of a pressure-sensitive adhesive film of the present invention.

FIG. 5 shows process drawings for illustrating a method for producing the pressure-sensitive adhesive layer shown in FIG. 1:

(a) illustrating a step of preparing an optical film on which a primer layer is laminated, (b) illustrating a step of forming a coating liquid layer prepared from an aqueous dispersion type pressure-sensitive adhesive composition on the surface of the primer layer, and (c) illustrating a step of drying the coating liquid layer to form the pressure-sensitive adhesive layer.

Figure 6:
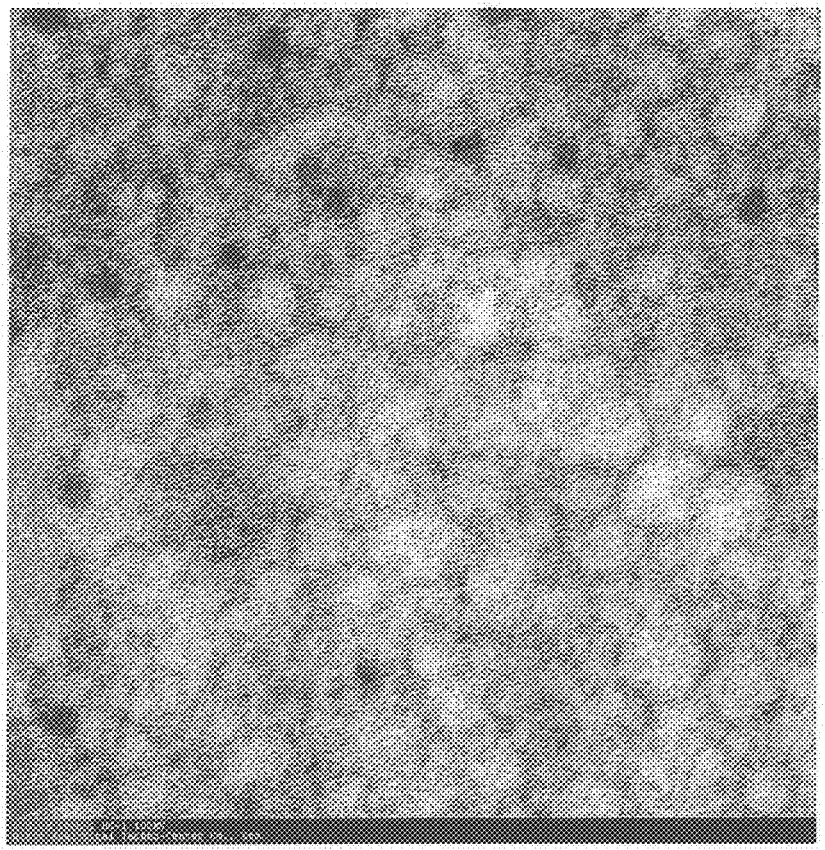

FIG. 6 shows a processed TEM image of the pressure-sensitive adhesive layer of Example 1.

Figure 7:
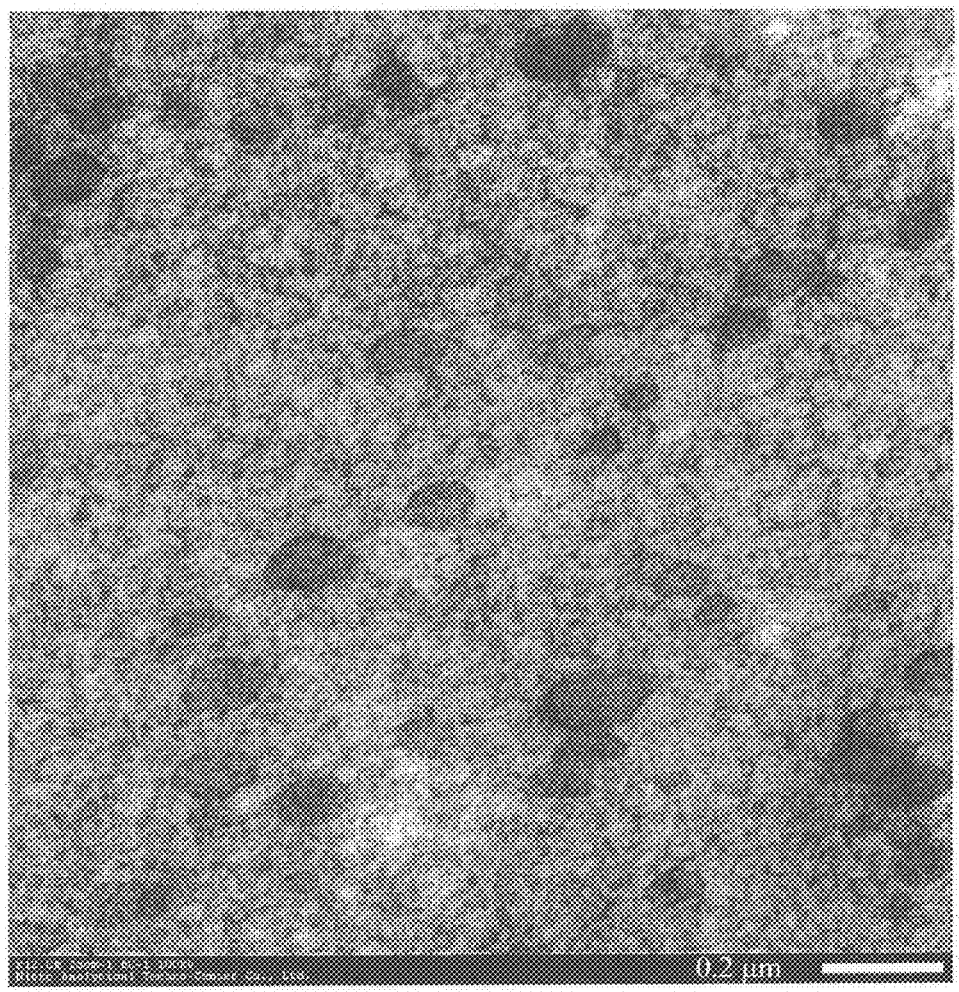

FIG. 7 shows a processed TEM image of the pressure-sensitive adhesive layer of Example 3.

EMBODIMENT OF THE INVENTION

A pressure-sensitive adhesive layer of the present invention can be obtained by applying an aqueous dispersion type pressure-sensitive adhesive composition to the surface of a member to be coated to be dried.

The aqueous dispersion type pressure-sensitive adhesive composition contains, for example, an aqueous dispersion type acrylic polymer and a thickener.

The aqueous dispersion type acrylic polymer can be obtained by polymerizing a monomer component which contains, as essential components, for example, an alkyl(meth)acrylate containing an alkyl group having 4 to 18 carbon atoms and a carboxyl group-containing vinyl monomer, and arbitrarily contains a copolymerizable vinyl monomer which is copolymerizable with the above-described essential components.

The alkyl(meth)acrylate containing an alkyl group having 4 to 18 carbon atoms is an alkyl(meth)acrylate in which the alkyl portion thereof is preferably a straight chain or branched chain alkyl group having 4 to 18 carbon atoms, that is, an alkyl methacrylate and/or an alkyl acrylate. Examples of the alkyl (meth)acrylate containing an alkyl group having 4 to 18 carbon atoms include butyl(meth)acrylate, isobutyl(meth)acrylate, sec-butyl(meth)acrylate, t-butyl(meth)acrylate, pentyl (meth)acrylate, neopentyl(meth)acrylate, isopentyl(meth) acrylate, hexyl(meth)acrylate, heptyl(meth)acrylate, octyl (meth)acrylate, 2-ethylhexyl(meth)acrylate, isooctyl(meth) acrylate, nonyl(meth)acrylate, isononyl(meth)acrylate, decyl (meth)acrylate, isodecyl(meth)acrylate, undecyl(meth) acrylate, dodecyl(meth)acrylate, tridecyl(meth)acrylate, tetradecyl(meth)acrylate, pentadecyl(meth)acrylate, hexadecyl(meth)acrylate, heptadecyl(meth)acrylate, and octadecyl (meth)acrylate.

These alkyl(meth)acrylates can be used alone or in combination.

The mixing ratio of the alkyl(meth)acrylate with respect to 100 parts by weight of the total amount of the monomer component is, for example, 60 to 99 parts by weight, preferably 70 to 99 parts by weight, or more preferably 80 to 99 parts by weight.

The carboxyl group-containing vinyl monomer is a vinyl monomer which contains a carboxyl group. Examples thereof include an unsaturated monocarboxylic acid such as (meth) acrylic acid, crotonic acid, and cinnamic acid; an unsaturated dicarboxylic acid such as fumaric acid, maleic acid, and itaconic acid; an unsaturated dicarboxylic acid anhydride such as fumaric acid anhydride, maleic acid anhydride, and itaconic acid anhydride; an unsaturated dicarboxylic acid monoester such as itaconic acid monomethyl ester, itaconic acid monobutyl ester, and 2-acryloyloxyethyl phthalic acid; an unsaturated tricarboxylic acid monoester such as 2-methacryloyloxyethyltrimellitic acid and 2-methacryloyloxyethylpyromellitic acid; and carboxyalkyl acrylate such as carboxyethyl acrylate and carboxypentyl acrylate.

These carboxyl group-containing vinyl monomers can be used alone or in combination. Preferably, an unsaturated monocarboxylic acid is used.

The mixing ratio of the carboxyl group-containing vinyl monomer with respect to 100 parts by weight of the total amount of the monomer component is, for example, 0.5 to 15 parts by weight, preferably 0.5 to 10 parts by weight, or more preferably 1 to 10 parts by weight.

An example of the copolymerizable vinyl monomer includes a functional group-containing vinyl monomer other than the carboxyl group-containing vinyl monomer. Examples thereof include a phosphoric acid group-containing vinyl monomer such as mono[monoalkylene oxide(meth) acrylate]phosphate ester and mono[polyalkylene oxide (meth)acrylate]phosphate ester; vinyl esters such as vinyl acetate and vinyl propionate; an epoxy group-containing monomer such as glycidyl(meth)acrylate and methylglycidyl (meth)acrylate; a hydroxyl group-containing vinyl monomer such as 2-hydroxyethyl acrylate, 2-hydroxypropyl acrylate, and 2-hydroxybutyl acrylate; an amide group-containing vinyl monomer such as (meth)acrylamide, N,N-dimethyl (meth)acrylamide, N,N-diethyl(meth)acrylamide, N-isopropyl(meth)acrylamide, N-butyl(meth)acrylamide, N-methoxymethyl(meth)acrylamide, N-methylol(meth)acrylamide, N-methylolpropane(meth)acrylamide, and N-vinylcarboxylic acid amide; a cyano group-containing vinyl monomer such as acrylonitrile and methacrylonitrile; an isocyanate group-containing vinyl monomer such as 2-methacryloyloxyethyl isocyanate; a maleimide-based vinyl monomer such as N-cyclohexylmaleimide, N-isopropylmaleimide, N-laurylmaleimide, and N-phenylmaleimide; an itaconimide-based vinyl monomer such as N-methylitaconimide, N-ethylitaconimide, N-butylitaconimide, N-octylitaconimide, N-2-ethylhexylitaconimide, N-cyclohexylitaconimide, and N-laurylitaconimide; a succinimide-based vinyl monomer such as N-(meth) acryloyloxymethylenesuccinimide, N-(meth)acryloyl-6-oxyhexamethylenesuccinimide, and N-(meth)acryloyl-8-oxyoctamethylenesuccinimide; a sulfonic acid group-containing vinyl monomer such as styrene sulfonic acid, allylsulfonic acid, 2-(meth)acrylamide-2-methylpropanesulfonic acid, (meth)acrylamidepropanesulfonic acid, sulfopropyl(meth)acrylate, and (meth)acryloyloxynaphthalenesulfonic acid; and a glycol-based acryl ester monomer such as (meth)acrylic acid polyethylene glycol, (meth)acrylic acid polypropylene glycol, (meth)acrylic acid methoxyethylene glycol, and (meth)acrylic acid methoxypolypropylene glycol.

An example of the copolymerizable vinyl monomer includes an alkoxysilyl group-containing vinyl monomer.

Examples of the alkoxysilyl group-containing vinyl monomer includes a silane-based (meth)acrylate monomer and a silane-based vinyl monomer.

Examples of the silane-based (meth)acrylate monomer include (meth)acryloyloxyalkyl-trialkoxysilane such as (meth)acryloyloxymethyl-trimethoxysilane, (meth)acryloyloxymethyl-triethoxysilane, 2-(meth)acryloyloxyethyl-trimethoxysilane, 2-(meth)acryloyloxyethyl-triethoxysilane, 3-(meth)acryloyloxypropyl-trimethoxysilane, 3-(meth)acryloyloxypropyl-triethoxysilane, 3-(meth)acryloyloxypropyl-tripropoxysilane, 3-(meth)acryloyloxypropyl-triisopropoxysilane, and 3-(meth)acryloyloxypropyl-tributoxysilane; (meth)acryloyloxyalkyl-alkyldialkoxysilane such as (meth)acryloyloxymethyl-methyldimethoxysilane, (meth)acryloyloxymethyl-methyldiethoxysilane, 2-(meth)acryloyloxyethyl-methyldimethoxysilane, 2-(meth)acryloyloxyethyl-methyldiethoxysilane, 3-(meth)acryloyloxypropyl-methyldimethoxysilane, 3-(meth)acryloyloxypropyl-methyldiethoxysilane, 3-(meth)acryloyloxypropyl-methyldipropoxysilane, 3-(meth)acryloyloxypropyl-methyldiisopropoxysilane, 3-(meth)acryloyloxypropyl-methyldibutoxysilane, 3-(meth)acryloyloxypropyl-ethyldimethoxysilane, 3-(meth)acryloyloxypropyl-ethyldiethoxysilane, 3-(meth)acryloyloxypropyl-ethyldipropoxysilane, 3-(meth)acryloyloxypropyl-ethyldiisopropoxysilane, 3-(meth)acryloyloxypropyl-ethyldibutoxysilane, 3-(meth)acryloyloxypropyl-propyldimethoxysilane and 3-(meth)acryloyloxypropyl-propyldiethoxysilane; and (meth)acryloyloxyalkyl-dialkyl(mono)alkoxysilanes corresponding to these monomers.

Examples of the silane-based vinyl monomer include vinyltrialkoxysilane such as vinyltrimethoxysilane, vinyltriethoxysilane, vinyltripropoxysilane, vinyltriisopropoxysilane, and vinyltributoxysilane, and vinylalkyldialkoxysilane and vinyldialkylalkoxysilane corresponding to these monomers; vinylalkyltrialkoxysilane such as vinylmethyltrimethoxysilane, vinylmethyltriethoxysilane, β-vinylethyltrimethoxysilane, β-vinylethyltriethoxysilane, γ-vinylpropyltrimethoxysilane, γ-vinylpropyltriethoxysilane, γ-vinylpropyltripropoxysilane, γ-vinylpropyltriisopropoxysilane, and γ-vinylpropyltributoxysilane, and (vinylalkyl)alkyldialkoxysilane or (vinylalkyl)dialkyl(mono)alkoxysilane corresponding to these monomers.

In addition to the above-described functional group-containing vinyl monomer and alkoxysilyl group-containing vinyl monomer, examples of the copolymerizable vinyl monomer include an olefin-based monomer such as ethylene, propylene, isoprene, butadiene, and isobutylene; alkyl(meth)acrylate containing a straight chain or branched chain alkyl group having 1 to 3 carbon atoms such as methyl(meth)acrylate, ethyl(meth)acrylate, propyl(meth)acrylate, and isopropyl(meth)acrylate; (meth)acrylic acid alicyclic hydrocarbon ester such as cyclohexyl(meth)acrylate, bornyl(meth)acrylate, and isobornyl(meth)acrylate; aryl(meth)acrylate ester such as phenyl(meth)acrylate; a styrene-based monomer such as styrene; a nitrogen atom-containing vinyl monomer such as (meth)acryloylmorpholine, aminoethyl(meth)acrylate, N,N-dimethylaminoethyl(meth)acrylate, and t-butylaminoethyl(meth)acrylate; an alkoxy group-containing vinyl monomer such as methoxyethyl(meth)acrylate and ethoxyethyl(meth)acrylate; a vinyl ether-based monomer such as vinyl ether; a halogen atom-containing vinyl monomer such as vinyl chloride; a vinyl group-containing heterocyclic compound such as N-vinyl pyrrolidone, N-(1-methylvinyl)pyrrolidone, N-vinylpyridine, N-vinyl piperidone, N-vinylpyrimidine, N-vinylpiperazine, N-vinylpyrazine, N-vinylpyrrole, N-vinylimidazole, N-vinyloxazole, N-vinylmorpholine, and tetrahydrofurfuryl(meth)acrylate; and an acrylate-based monomer containing a halogen atom such as fluorine atom.

Furthermore, an example of the above-described copolymerizable vinyl monomer includes a polyfunctional monomer.

Examples of the polyfunctional monomer include (mono or poly)alkylene glycol di(meth)acrylate such as (mono or poly)ethylene glycol di(meth)acrylate including ethylene glycol di(meth)acrylate, diethylene glycol di(meth)acrylate, triethylene glycol di(meth)acrylate, and tetraethylene glycol di(meth)acrylate and propylene glycol di(meth)acrylate; neopentyl glycol di(meth)acrylate; 1,6-hexanediol di(meth)acrylate; pentaerythritol di(meth)acrylate; trimethylolpropane tri(meth)acrylate; pentaerythritol tri(meth)acrylate; dipentaerythritol hexa(meth)acrylate; and divinyl benzene. Examples of the polyfunctional monomer also include epoxy acrylate, polyester acrylate, and urethane acrylate.

These copolymerizable vinyl monomers can be used alone or in combination of two or more.

Of the copolymerizable vinyl monomers, preferably, a phosphoric acid group-containing vinyl monomer and an alkoxysilyl group-containing vinyl monomer are used, or more preferably, mono[polyalkylene oxide(meth)acrylate] phosphate ester and a silane-based (meth)acrylate monomer are used.

The mixing ratio of the copolymerizable vinyl monomer with respect to 100 parts by weight of the total amount of the monomer component is, for example, 39 parts by weight or less, preferably 19 parts by weight or less, or more preferably 18 parts by weight or less.

When the phosphoric acid group-containing vinyl monomer is blended, the mixing ratio of the phosphoric acid group-containing vinyl monomer with respect to 100 parts by weight of the total amount of the monomer component is, for example, 0.5 to 20 parts by weight, preferably 0.5 to 10 parts by weight, or more preferably 1 to 5 parts by weight.

When the alkoxysilyl group-containing vinyl monomer is blended, the mixing ratio of the alkoxysilyl group-containing vinyl monomer with respect to 100 parts by weight of the total amount of the monomer component is, for example, 0.001 to 1 parts by weight, or preferably 0.005 to 0.1 parts by weight.

In order to obtain an aqueous dispersion type acrylic polymer by polymerizing the above-described monomer component, the monomer component is blended at the above-described mixing proportion to be polymerized by a polymerization method such as emulsion polymerization (including suspension polymerization).

In the emulsion polymerization, for example, a polymerization initiator, an emulsifier, or the like are blended with the above-described monomer component in water to be polymerized. To be more specific, a known emulsion polymerization method such as a collective charging method (a collective polymerization method), a monomer dropping method, or a monomer emulsion dropping method can be used. In the monomer dropping method, continuous dropping or divisional dropping is selected. The reaction conditions and the like are appropriately selected and the polymerization temperature is, for example, 20 to 100° C.

Before, during, or after the blending of the polymerization initiator with respect to the above-described monomer component, the dissolved oxygen concentration in a reaction liquid containing the monomer component can be reduced by nitrogen substitution.

The polymerization initiator is not particularly limited and a polymerization initiator which is usually used in the emulsion polymerization is used. Examples thereof include an azo-based initiator such as 2,2'-azobisisobutyronitrile (AIBN), 2,2'-azobis(2-methylpropioneamidine)disulfate, 2,2'-azobis(2-methylpropioneamidine)dihydrochloride, 2,2'-azobis(2-amidinopropane)dihydrochloride, 2,2'-azobis[N-(2-carboxyethyl)-2-methylpropioneamidine]hydrate, 2,2'-azobis(N,N'-dimethyleneisobutylamidine), and 2,2'-azobis[2-(2-imidazolin-2-yl)propane]dihydrochloride; a persulfate-based initiator such as potassium persulfate (KPS) and ammonium persulfate (APS); a peroxide-based initiator such as benzoyl peroxide, t-butyl hydroperoxide, and hydrogen peroxide; a substituted ethane-based initiator such as phenyl-substituted ethane; a carbonyl-based initiator such as an aromatic carbonyl compound; and a redox-based initiator such as combination of persulfate and sodium hydrogen sulfite and combination of peroxide and sodium ascorbate.

These polymerization initiators can be used alone or in combination of two or more. Of the polymerization initiators, preferably, a persulfate-based initiator is used.

The mixing ratio of the polymerization initiator is appropriately selected and is, for example, 0.04 to 1 parts by weight with respect to 100 parts by weight of the monomer component.

The emulsifier is not particularly limited and a known emulsifier which is usually used in the emulsion polymerization is used. Examples thereof include an anionic emulsifier such as sodium lauryl sulfate, ammonium lauryl sulfate, sodium dodecylbenzenesulfonate, polyoxyethylene sodium lauryl sulfate, sodium polyoxyethylene alkyl ether sulfate, ammonium polyoxyethylene alkyl phenyl ether sulfate, sodium polyoxyethylene alkyl phenyl ether sulfate, and sodium polyoxyethylene alkyl sulfosuccinate and a nonionic emulsifier such as polyoxyethylene alkyl ether, polyoxyethylene alkyl phenyl ether, polyoxyethylene fatty acid ester, and polyoxyethylene polyoxypropylene block polymer.

As the emulsifier, a radical polymerizable emulsifier (for example, a reactive emulsifier such as AQUALON HS-10 (manufactured by DAI-ICHI KOGYO SEIYAKU CO., LTD.)) in which a radical polymerizable functional group (a reactive group) such as a propenyl group or an allyl ether group is introduced into the above-described anionic emulsifier or nonionic emulsifier is used.

These emulsifiers can be used alone or in combination of two or more. Preferably, a reactive emulsifier is used.

The mixing ratio of the emulsifier with respect to 100 parts by weight of the monomer component is, for example, 0.2 to 10 parts by weight, or preferably 0.5 to 5 parts by weight.

The aqueous dispersion type acrylic polymer obtained by the emulsion polymerization is prepared as an emulsion (an aqueous dispersion type), that is, an aqueous dispersion of the acrylic polymer.

The aqueous dispersion type acrylic polymer can be also prepared as follows: for example, the above-described monomer component is polymerized by a method, other than the emulsion polymerization, such as solution polymerization or bulk polymerization and if necessary, after removing a solvent or pulverizing an aggregate, the polymerized monomer component is dispersed in water by the above-described emulsifier.

The concentration of solid content in the aqueous dispersion type acrylic polymer is, for example, 10 to 90 weight %, or preferably 20 to 80 weight %.

The thickener is blended in the aqueous dispersion type pressure-sensitive adhesive composition so as to set the viscosity of the aqueous dispersion type pressure-sensitive adhesive composition within a desired range (described later). Examples of the thickener include a polyacrylic acid thickener, a urethane thickener, a cellulose thickener, and a naturally occurring polymer thickener.

Example of the polyacrylic acid thickener include polyacrylic acid and a polyacrylic acid-alkyl poly(meth)acrylate copolymer (an acrylic acid copolymer). An example of the polyacrylic acid thickener also includes a neutralized substance prepared by neutralizing the above-described polyacrylic acid in advance, that is, polyacrylate. Examples of the polyacrylate include sodium polyacrylate and potassium polyacrylate. An example of the polyacrylic acid thickener also includes a hydrophobic group-modifying polyacrylic acid in which a part of a carboxyl group is modified by a hydrophobic group such as a styrene group and an alkyl group.

The acid value of the polyacrylic acid thickener is, for example, 30 to 300 mg/KOH, or preferably 80 to 280 mg/KOH.

The urethane thickener is a urethane compound which has, in a molecule, a urethane bond and a polyether chain, and is capable of developing a thickening function by allowing the urethane bonds to gather with each other in water.

Examples of the cellulose thickener include methyl cellulose, ethyl cellulose, hydroxymethyl cellulose, hydroxyethyl cellulose, hydroxypropyl cellulose, hydroxypropylmethyl cellulose, and carboxymethyl cellulose.

Examples of the naturally occurring polymer thickener include xanthane gum, gellan gum, guar gum, sodium alginate, carrageenan, and pectin.

Examples of the thickener also include polyacrylamide, polyethylene oxide, and polyvinyl alcohol.

These thickeners can be used alone or in combination of two or more.

As the thickener, preferably, in view of improving the appearance of the pressure-sensitive adhesive layer, a polyacrylic acid thickener and a urethane thickener are used.

A commercially available product can be used as the thickener. To be specific, examples of the polyacrylic acid thickener include Primal ASE-60, Primal TT-615, Primal ASE-75, Primal ASE-95, Primal ASE-108, Primal RM-5 (all of the above, manufactured by Rohm and Haas Company); Zogen 100, Zogen 150, Zogen 200, Zogen 250, and Zogen 350 (all of the above, manufactured by Rheox Inc.); SN Thickener A-815, SN Thickener A-818, and SN Thickener A-850 (all of the above, manufactured by SAN NOPCO LIMITED); RHEOVIS CR (manufactured by Ipposha Oil Industries Co., Ltd.); Aron B-300K, Aron B-500 (an acrylic acid-based copolymer), and Aron A-7070 (all of the above, manufactured by TOAGOSEI CO., LTD.); THIXOL K-150B (manufactured by KYOEISHA CHEMICAL Co., LTD); and ACRYSET WR-503 and ACRYSET WR-650 (all of the above, manufactured by NIPPON SHOKUBAI CO., LTD.). An example of the polyacrylic acid thickener also includes SN Thickener 640 (hydrophobic group-modifying polyacrylic acid, manufactured by SAN NOPCO LIMITED).

Examples of the urethane thickener include ADEKANOL UH-462, ADEKANOL UH-752, ADEKANOL UH-1405, ADEKANOL UH-420, ADEKANOL UH-438, ADEKANOL UH-472, ADEKANOL UH-450, ADEKANOL UH-540, ADEKANOL UH-550, ADEKANOL UH-541VF, ADEKANOL UH-526, and ADEKANOL UH-530 (all of the above, manufactured by ADEKA CORPORATION); RHEOLATE 266, RHEOLATE 288, RHEOLATE 244, RHEOLATE 255, and RHEOLATE 278 (all of the above, manufactured by Rheox Inc.); and SN Thickener A-803, SN Thickener A-804, SN Thickener A-807, SN Thickener A-812, and SN Thickener A-814 (all of the above, manufactured by SAN NOPCO LIMITED).

The above-described thickener is prepared in a form such as a powder (particle) type, an aqueous solution type, or an emulsion type.

The thickener is prepared as an aqueous solution of 1 weight % and furthermore, when a pH thereof is adjusted to be 8, the turbidity is, for example, 100 NTU or less, preferably 50 NTU or less, or more preferably 20 NTU or less, and is usually 0.1 NTU or more.

In order to adjust the pH of the aqueous solution of 1 weight % to be 8, for example, an alkali aqueous solution such as an ammonia aqueous solution with a concentration of 5 to 15 weight % is added to an aqueous solution of 1 weight % of the thickener. The addition amount of the alkali aqueous solution is adjusted so that the decreasing rate of the concentration of the thickener is, for example, within 1% by the addition.

The turbidity is measured with a turbidimeter. NTU is a unit of the turbidity (Nephelometric Turbidity Unit).

When the turbidity of the aqueous solution of 1 weight % of the thickener after the adjustment of pH exceeds the above-described range, there may be a case where insoluble substances (particles) of the thickener remain and also in the pressure-sensitive adhesive layer, the thickener, as it is, is present as relatively large particles, so that the transparency of the pressure-sensitive adhesive layer is reduced, causing the white turbidity.

The mixing ratio of the thickener (a solid content thereof) with respect to 100 parts by weight of the solid content of the aqueous dispersion type acrylic polymer is, for example, 0.01 to 20 parts by weight, preferably 0.1 to 10 parts by weight, or more preferably 0.5 to 5 parts by weight. The mixing ratio of the thickener (a solid content thereof) with respect to the component other than the solid content of the aqueous dispersion type pressure-sensitive adhesive composition, that is, 100 parts by weight of water can be also set to be, for example, 0.01 to 20 parts by weight, preferably 0.1 to 10 parts by weight, or more preferably 0.5 to 5 parts by weight.

When the mixing proportion of the thickener is within the above-described range, the viscosity of the aqueous dispersion type pressure-sensitive adhesive composition can be set to be within a desired range (described later).

In order to prepare the aqueous dispersion type pressure-sensitive adhesive composition, the aqueous dispersion type acrylic polymer and the thickener are blended at the above-described mixing proportion. To be specific, the aqueous dispersion type acrylic polymer and the thickener are blended to be uniformly stirred, so that an aqueous dispersion liquid mixture is prepared.

Next, water is added to the aqueous dispersion liquid mixture as required, so that the concentration of solid content of the aqueous dispersion type pressure-sensitive adhesive composition is adjusted to be, for example, 5 to 32 weight %, preferably 7 to 29 weight %, or more preferably 10 to 25 weight %.

When the concentration of solid content of the aqueous dispersion type pressure-sensitive adhesive composition is within the above-described range, the handling ability at the time of application is improved, so that a thickness T1 (described later) of a coating liquid layer 2 can be set to be within a specific range. On the other hand, when the concentration of solid content of the aqueous dispersion type pressure-sensitive adhesive composition exceeds the above-described range, the number of a concave portion 5 may exceed a desired range.

Thereafter, the pH of the aqueous dispersion type pressure-sensitive adhesive composition in which the concentration of solid content is adjusted is adjusted to be, for example, 7 to 10, or preferably 7 to 9 as required.

The pH of the aqueous dispersion type pressure-sensitive adhesive composition is adjusted by, for example, adding an alkali aqueous solution such as an ammonia aqueous solution with a concentration of 5 to 15 weight % to the aqueous dispersion type pressure-sensitive adhesive composition in which the concentration of solid content is adjusted. The addition amount of the alkali aqueous solution is adjusted so that the decreasing rate of the concentration of solid content in the aqueous dispersion type pressure-sensitive adhesive composition is, for example, within 1% by the addition.

When the thickener is a polyacrylic acid thickener, the pH of the aqueous dispersion type pressure-sensitive adhesive composition in which the concentration of solid content is adjusted usually exceeds 10, so that the thickening function is developed by adjusting the pH of the aqueous dispersion type pressure-sensitive adhesive composition within the above-described range to neutralize the carboxyl group.

The viscosity of the aqueous dispersion type pressure-sensitive adhesive composition prepared in this way at 30° C. and a shear rate of 1 $sec^{-1}$ is, for example, 0.1 to 50 Pa·s, or preferably 0.2 to 20 Pa·s.

The viscosity of the aqueous dispersion type pressure-sensitive adhesive composition at 30° C. and a shear rate of 1 $sec^{-1}$ is measured with a corn plate type viscometer (a rheometer).

When the viscosity of the aqueous dispersion type pressure-sensitive adhesive composition is below the above-described range, there may be a case where the aqueous dispersion type pressure-sensitive adhesive composition repels on a member to be coated (described later) at the time of application, so that the application becomes difficult. On the other hand, when the viscosity of the aqueous dispersion type pressure-sensitive adhesive composition exceeds the above-described range, the number of the concave portion 5 may exceed a desired range.

FIG. 1 shows process drawings for illustrating a method for producing one embodiment of a pressure-sensitive adhesive layer of the present invention. FIGS. 2 and 3 show process drawings for illustrating a method for producing a pressure-sensitive adhesive layer in the case where a foreign object is present between the back surface of a release film and the surface of a supporting member.

Next, a method for producing one embodiment of the pressure-sensitive adhesive layer of the present invention is described with reference to FIGS. 1 to 3.

In this method, first, a member to be coated, for example, a film, to be specific, a release film 1 is prepared.

The release film 1 is formed from, for example, a soft material. To be specific, examples thereof include a synthetic resin film such as polyethylene, polypropylene, and polyethylene terephthalate (PET); a fabric; a non-woven fabric; a net; a foamable film; a metal foil (for example, an aluminum foil); or a laminated film in which a plurality thereof are laminated. The surface of the release film 1 is subjected to a treatment (a peeling treatment) such as a silicone treatment, a long-chain alkyl treatment, or a fluorine treatment as required so as to enhance the peeling properties.

The thickness of the release film 1 is not particularly limited and is, for example, 1 to 1000 μm, or preferably 10 to 100 μm.

Next, in this method, as shown in FIG. 1 (*b*), the aqueous dispersion type pressure-sensitive adhesive composition is applied to the surface of the release film 1, so that the coating liquid layer 2 is formed.

The aqueous dispersion type pressure-sensitive adhesive composition is applied to the surface of the release film 1 by a known application method. Examples of the known application method include a kiss coating method, a gravure coating method, a bar coating method, a spray coating method, a knife coating method, a wire coating method, and a comma coating method.

When the aqueous dispersion type pressure-sensitive adhesive composition is applied to the surface of the release film 1, for example, as shown in FIGS. 2 (*a*) and 3 (*a*), the back surface of the release film 1 is brought into contact with the surface of a supporting member 7 to support the release film 1.

When the release film 1 is formed into a long-length shape, as the supporting member 7, for example, a coating roll or the like is used. The coating roll is disposed partway in a long-length direction of the release film 1. While the release film 1 passes through the coating roll, the aqueous dispersion type pressure-sensitive adhesive composition is applied to the surface of the release film 1. The release film 1 to which the aqueous dispersion type pressure-sensitive adhesive composition is applied is separated from the coating roll after passing through the coating roll.

When the release film 1 is formed into a flat paper shape, as the supporting member 7, for example, a supporting board or the like in a flat plate shape is used. At the time of application of the aqueous dispersion type pressure-sensitive adhesive composition, the supporting board is disposed on the entire back surface of the release film 1. After the formation of the coating liquid layer, the release film 1 is peeled from the supporting member 7.

The above-described supporting member 7 is made of, for example, a hard material which is harder than the soft material that forms the release film 1. To be specific, the supporting member 7 is made of a hard material such as a metal including iron and stainless steel.

The thickness T1 of the coating liquid layer 2 is, for example, 5 to 2000 μm, or preferably 10 to 1000 μm. When the thickness T1 of the coating liquid layer 2 is within the above-described range, a thickness T2 (described later) of a pressure-sensitive adhesive layer 6 can be set to be within a desired range and the number of the concave portion 5 (described later, ref: FIG. 3) can be set to be a desired number or less.

Next, in this method, as shown in FIG. 1 (*c*), the coating liquid layer 2 is dried.

The drying temperature is, for example, 90 to 150° C., or, for example, 100 to 140° C. The drying time is, for example, 0.5 to 30 minutes, or preferably 1 to 10 minutes.

In this way, the pressure-sensitive adhesive layer 6 can be obtained. That is, the moisture of the coating liquid layer 2 is distilled off by the above-described drying and the pressure-sensitive adhesive layer 6 prepared from the solid content (mainly a mixture of the acrylic polymer and the thickener) of the aqueous dispersion type pressure-sensitive adhesive composition is formed.

The thickness T2 of the pressure-sensitive adhesive layer 6 obtained in this way is, for example, 10 to 60%, or preferably 20 to 50% with respect to the thickness T1 of the coating liquid layer 2 and is, to be specific, for example, 3 to 100 μm, or preferably 20 to 40 μm.

When the thickness T2 of the pressure-sensitive adhesive layer 6 is within the above-described range, a substrate (to be specific, an optical film 11 (ref: FIG. 4) or the like) and an adherend (to be specific, a glass plate or the like of an optical device) can be surely adhered to each other.

The haze value of the pressure-sensitive adhesive layer 6 having a thickness of 23 μm is, for example, 1.0% or less, or preferably 0.9% or less, and is usually 0.1% or more.

The haze value of the pressure-sensitive adhesive layer 6 is measured in conformity with JIS K7136 with a haze meter.

When the haze value of the pressure-sensitive adhesive layer 6 exceeds the above-described range, there may be a case where the transparency of the pressure-sensitive adhesive layer 6 is reduced, so that an excellent appearance of the pressure-sensitive adhesive layer 6 cannot be ensured.

In the pressure-sensitive adhesive layer 6, on the surface thereof, the number of the concave portion 5 to be described next is 5 or less, or preferably 1 or less per 1 m$^2$.

Next, the concave portion 5 is described in details with reference to FIGS. 2 and 3.

As referred in FIG. 3 (*c*), the concave portion 5 is a portion (a defective portion) which is dented from the surface of the pressure-sensitive adhesive layer 6 toward the back surface thereof. The concave portion 5 is defined as a defective portion which has sizes as follows: a depth D in the thickness direction of 0.2 to 20 μm and a maximum length along the surface (for example, in the case of a circular shape in plane view, an inner diameter of the upper end) L2 of 1 to 10 mm To be specific, as shown in FIGS. 2 (*a*) and 3 (*a*), when the coating liquid layer 2 is formed on the surface of the release film 1, a foreign object 8 may be interposed between the back surface of the release film 1 and the surface of the supporting member 7.

The maximum length of the foreign object 8 is, for example, 1 to 1000 μm, or furthermore 10 to 100 μm.

When the foreign object 8 is present as described above, the release film 1 is formed so that the back surface of the surface having a portion (a protruding portion 13) which is opposed to the foreign object 8 in the thickness direction curves (protrudes) toward the top side (the upper side) of the release film 1, and the surface of the protruding portion 13 curves (protrudes) toward the top side (the upper side) of the protruding portion 13. The release film 1 is formed so that the thickness of the protruding portion 13 and that of the portion around the protruding portion 13 are uniform.

In this case, the coating liquid layer 2 is prepared from the aqueous dispersion type pressure-sensitive adhesive composition prepared as an emulsion, so that on the back surface of the coating liquid layer 2, that is, the surface which is opposed to the release film 1, a back-side concave portion 9 corresponding to the protruding portion 13 on the surface of the release film 1 is formed, while the surface of the coating liquid layer 2 is formed into a flat shape.

The size and the number of the back-side concave portion 9 correspond to the size and the number of the protruding portion 13 on the surface of the release film 1 described above, respectively.

Next, as shown in FIGS. 2 (*b*) and 3 (*b*), when the release film 1 is separated from the supporting member 7, both surfaces of the surface and the back surface of the release film 1 return to be a flat shape.

With the description above, on the surface of the coating liquid layer 2, a top-side concave portion 4 corresponding to the above-described back-side concave portion 9 (ref: FIGS.

2 (*a*) and 3 (*a*)) is formed, while on the back surface of the coating liquid layer 2, the above-described back-side concave portion 9, along with the portion around the back-side concave portion 9, is formed into a flat shape and disappears.

The top-side concave portion 4 is dented from the surface of the coating liquid layer 2 toward the back side thereof. The size and the number thereof substantially correspond to the size and the number of the above-described protruding portion 13, respectively.

Next, as shown in FIGS. 2 (*c*) and 3 (*c*), the pressure-sensitive adhesive layer 6 is formed by the drying of the coating liquid layer 2.

The thickness (the thickness of the portion excluding the concave portion 5 to be described later) T2 of the pressure-sensitive adhesive layer 6 in FIG. 2 (*c*) obtained from the aqueous dispersion type pressure-sensitive adhesive composition having the above-described concentration of solid content is formed to be significantly thin, compared with the thickness T1 (the thickness of the portion excluding the top-side concave portion 4) of the coating liquid layer 2 in FIG. 2 (*b*). That is, the proportion (T2/T1) of the thickness T2 of the pressure-sensitive adhesive layer 6 to the thickness T1 of the coating liquid layer 2 is significantly small to therefore be less subjected to the influence of the top-side concave portion 4, so that the size of the concave portion 5 in FIG. 2 (*c*) is formed to be small, that is, to be smaller (shallower) than the lower limit of the size (the maximum depth D) defined in the description above.

On the other hand, a thickness T2' of the pressure-sensitive adhesive layer 6 obtained from the aqueous dispersion type pressure-sensitive adhesive composition having a thicker concentration (for example, a concentration exceeding 32 weight %) of solid content than the above-described concentration of solid content cannot be formed to be significantly thin, compared with a thickness T1' of the coating liquid layer 2. That is, the proportion (T2'/T1') of the thickness T2' of the pressure-sensitive adhesive layer 6 to the thickness T1' of the coating liquid layer 2 is relatively large and is also larger than the above-described proportion (T2/T1) of the thickness T2 of the pressure-sensitive adhesive layer 6 to the thickness T1 of the coating liquid layer 2 in FIG. 2 to be therefore subjected to the influence of the top-side concave portion 4, so that the concave portion 5 in FIG. 3 (*c*) is at least deeper than the concave portion 5 in FIG. 2 (*c*) and to be specific, is formed within a range of the size (the maximum depth D) defined in the description above.

As described above, in the pressure-sensitive adhesive layer 6, when the concentration of solid content of the aqueous dispersion type pressure-sensitive adhesive composition is set to be low at a specific concentration, the number of the concave portion 5 after drying is small, to be specific, the number of the concave portion 5 is a desired number or less, so that an excellent appearance is held. Therefore, the pressure-sensitive adhesive layer 6 is used for various industrial uses, preferably for optical use which requires an excellent appearance.

FIG. 4 shows a sectional view of a pressure-sensitive adhesive optical film which is one embodiment of a pressure-sensitive adhesive film of the present invention.

Next, a method for producing a pressure-sensitive adhesive optical film which is one embodiment of a pressure-sensitive adhesive film of the present invention including the above-described pressure-sensitive adhesive layer 6 is described with reference to FIG. 4.

In FIG. 4, a pressure-sensitive adhesive optical film 10 includes an optical film 11 as a substrate, a primer layer 12 laminated on the surface of the optical film 11, and the pressure-sensitive adhesive layer 6 laminated on the surface of the primer layer 12.

The optical film 11 is a film having optical characteristics and is used in, for example, an image display device or the like to be described in details later. The optical film 11 serves as an optical layer in the image display device. Examples of the optical film 11 include a polarizing film, a phase difference film, a luminance improving film, a viewing angle expansion film (a viewing angle compensation film), and a surface treatment film.

As the polarizing film, for example, one having a transparent protective film provided on one surface or both surfaces of a polarizer is used.

The polarizer is not particularly limited, and examples thereof include one obtained by dyeing a hydrophilic polymer film such as a polyvinyl alcohol-based film, a partially formalized polyvinyl alcohol-based film, and an ethylene-vinyl acetate copolymer partially saponified film with a dichroic substance such as iodine or dichroic dye and then, uniaxially stretching the dyed film; and a polyene oriented film subjected to a dehydration treatment of polyvinyl alcohol or a dehydrochlorination treatment of polyvinyl chloride. Preferably, a polarizer obtained by dyeing a polyvinyl alcohol-based film with iodine and then, uniaxially stretching the dyed film is used.

Examples of the transparent protective film include a polyester polymer film such as polyethylene terephthalate and polyethylene naphthalate; a cellulose polymer film such as diacetyl cellulose and triacetyl cellulose; an acrylic polymer film such as polymethyl methacrylate; a styrene polymer film such as polystyrene and an acrylonitrile-styrene copolymer (an AS resin); and a polycarbonate polymer film. Examples of the transparent protective film further includes a polyolefin polymer film such as polyethylene, polypropylene, polyolefin having a cyclo or norbornene structure, and an ethylene-propylene copolymer; a vinyl chloride polymer film; nylon; an amide polymer film such as aromatic polyamide; an imide polymer film; a sulfone polymer film; a polyethersulfone polymer film; a polyether ether ketone polymer film; a polyphenylene sulfide polymer film; a vinyl alcohol polymer film; a vinylidene chloride polymer film; a vinyl butyral polymer film; an allylate polymer film; a polyoxymethylene polymer film; an epoxy polymer film; or a film such as a blend of the above-described polymers.

The transparent protective film can be formed as a cured layer made of an acrylic-based, urethane-based, acryl-urethane-based, epoxy, or silicone thermosetting or ultraviolet curable resin.

As the transparent protective film, preferably, a cellulose polymer is used. The thickness of the transparent protective film is not particularly limited and is, for example, 500 μm or less, preferably 1 to 300 μm, or more preferably 5 to 200 μm.

The polarizer is bonded with the transparent protective film using, for example, an isocyanate adhesive, a polyvinyl alcohol adhesive, a gelatin adhesive, a vinyl adhesive, a latex adhesive, water polyester adhesive, or the like.

An example of the phase difference film includes a wavelength plate such as a λ/2 wavelength plate or a λ/4 wavelength plate. To be specific, examples of the phase difference film include a double refraction film obtained by uniaxially or biaxially stretching a polymer material, an oriented film of a liquid crystal polymer, and a film composed of an oriented layer made of a liquid crystal polymer supported thereon. The thickness of the phase difference film is not particularly limited and is, for example, 20 to 150 μm.

Examples of the polymer material include polyvinyl alcohol, polyvinyl butyral, polymethyl vinyl ether, polyhydroxyethyl acrylate, hydroxyethyl cellulose, hydroxypropyl cellulose, methyl cellulose, polycarbonate, polyarylate, polysulfone, polyethylene terephthalate, polyethylene naphthalate, polyether sulfone, polyphenylene sulfide, polyphenylene oxide, polyallyl sulfone, polyvinyl alcohol, polyamide, polyimide, polyolefin, polyvinyl chloride, a cellulose-based polymer, or various two-dimensional or three-dimensional copolymers thereof, a graft copolymer, and blends. These polymer materials are formed into an oriented substance (a stretched film) by stretching or the like.

Examples of the liquid crystal polymer include various main chain type or side chain type liquid crystal polymers in which a conjugated straight chain atomic group (mesogen) capable of imparting liquid crystal orientation is introduced into the main chain or a side chain of the polymer. The main chain type liquid crystal polymer has a structure in which a mesogenic group is bonded at the spacer moiety capable of imparting flexibility. To be specific, examples thereof include a nematically oriented polyester-based liquid crystal polymer, a discotic polymer, and a cholesteric polymer. An example of the side chain type liquid crystal polymer includes one which contains polysiloxane, polyacrylate, polymethacrylate, or polymalonate as a main chain skeleton and also has, as a side chain, a mesogenic moiety composed of a para-substituted cyclic compound unit capable of imparting nematic orientation via a spacer moiety composed of a conjugated atomic group. These liquid crystal polymers are obtained by, for example, spreading a solution of a liquid crystal polymer over an oriented surface such as the surface of a thin film made of polyimide or polyvinyl alcohol formed on a glass plate subjected to a rubbing treatment, or to an oblique deposition with silicon oxide and then, conducting heat treatment.

The phase difference film may be one used for the purpose of coloring of films having various wavelengths and a liquid crystal layer due to double refraction or of enlarging a viewing angle, one having phase difference in accordance with the purpose of use, or one controlling optical characteristics such as phase difference by laminating two or more phase difference films.

Examples of the luminance improving film include one which allows permeation of linear polarization of a predetermined polarizing axis and reflects other light, such as a multilayered thin film of a dielectric or a multilayered laminate composed of thin films each having different refractive index anisotropy and one which reflects either left-hand or right-hand circularly polarized light and allows permeation of other light, such as an oriented film of a cholesteric liquid crystal polymer or a film having an oriented liquid crystal layer supported on the film substrate. The thickness of the luminance improving film is, for example, 10 to 200 μm.

The viewing angle expansion film is a film used to enlarge a viewing angle so that images can be seen relatively clearly even when the image plane of the liquid crystal display is viewed from a slightly diagonal direction with respect to the image plane, not from a perpendicular direction to the image plane. Examples thereof include a phase difference film, an oriented film made of liquid crystal polymer, and a film having an oriented layer such as a liquid crystal polymer supported by a transparent substrate. Examples of the phase difference film used as the viewing angle expansion film include a polymer film having double refraction obtained by biaxially stretched in the plane direction; a polymer film having double refraction, in which the refractive index in the thickness direction is controlled, obtained by uniaxially stretching in the plane direction and also stretching in the thickness direction; and a biaxially stretched film such as an inclined oriented film. The thickness of the viewing angle expansion film is, for example, 10 to 200 μm.

Examples of the surface treatment film include a hard coat film for imparting excoriation resistance to the surface of an image display device, an anti-reflection film such as an anti-glare film for preventing reflected glare on the image display device and an anti-reflective film, and a reflection-reducing film such as a low reflective film for reducing reflected glare on the image display device.

Examples of the optical film include a reflecting plate and a semi-transmissive plate.

The above-described optical films can be used in one layer or in two layers or more.

In order to obtain the pressure-sensitive adhesive optical film, first, the optical film 11 is prepared and next, the primer layer 12 is disposed on the surface of the optical film 11.

The primer layer 12 contains, for example, an oxazoline group-containing polymer and/or a water-soluble or aqueous dispersion electrically-conductive material.

The oxazoline group-containing polymer has the main chain composed of an acrylic skeleton or a styrene skeleton and has an oxazoline group in a side chain of the main chain. Preferably, an oxazoline group-containing acrylic polymer having the main chain composed of an acrylic skeleton and having an oxazoline group in a side chain of the main chain is used.

Examples of the oxazoline group include a 2-oxazoline group, a 3-oxazoline group, and a 4-oxazoline group. Preferably, a 2-oxazoline group is used.

Generally, the 2-oxazoline group is represented by the following general formula (I).

[Chemical Formula 1]

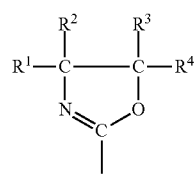

(where, in general formula (I), R1, R2, R3, and R4 each independently represent a hydrogen atom, a halogen atom, an alkyl group, an aralkyl group, a phenyl group, or a substituted phenyl group.)

In the oxazoline group-containing polymer, the oxazoline value is, for example, 1500 g solid/eq. or less, or preferably 1200 g solid/eq. or less.

A commercially available product can be used as the oxazoline group-containing polymer. To be specific, examples thereof include an oxazoline group-containing acrylic polymer such as EPOCROS WS-500 (an aqueous solution type, a solid content of 40%, the main chain: acrylic, a pH of 7 to 9, an oxazoline value of 220 g solid/eq., manufactured by NIPPON SHOKUBAI CO., LTD.) and EPOCROS WS-700 (an aqueous solution type, a solid content of 25%, the main chain: acrylic, a pH of 7 to 9, an oxazoline value of 220 g solid/eq., manufactured by NIPPON SHOKUBAI CO., LTD.) and an oxazoline group-containing acrylic/styrene polymer such as an EPOCROS K-1000 series (an emulsion type, a solid content of 40%, the main chain: styrene/acrylic, an oxazoline value of 1100 g solid/eq., a pH of 7 to 9, manufactured by NIPPON SHOKUBAI CO., LTD.) and an EPOCROS K-2000 series (an emulsion type, a solid content of 40%, the main chain: styrene/acrylic, a pH of 7 to 9, an oxazoline value of 550 g solid/eq., manufactured by NIPPON SHOKUBAI CO., LTD.). In view of improving adhesion, preferably, an aqueous solution type is used.

These oxazoline group-containing polymers can be used alone or in combination of two or more.

Examples of a water-soluble or aqueous dispersion electrically-conductive material include an electrically-conductive polymer and an organic metal compound. Preferably, an electrically-conductive polymer is used.

Examples of the electrically-conductive polymer include polyaniline, polythiophene, polypyrrole, and polyquinoxaline. Of these, in view of coating properties, preferably, polyaniline or polythiophene is used.

The weight average molecular weight of the polyaniline in the GPC measurement with polystyrene (PS) calibration is, for example, 500000 or less, or preferably 300000 or less. The weight average molecular weight of the polythiophene in the GPC measurement with polystyrene calibration is, for example, 400000 or less, or preferably 300000 or less.

A commercially available product is used as the water-soluble or aqueous dispersion electrically-conductive polymer. To be specific, an example of the water-soluble electrically-conductive polymer includes polyaniline sulfonic acid (manufactured by Mitsubishi Rayon Co., Ltd.) and an example of the aqueous dispersion electrically-conductive material includes a polythiophene-based electrically-conductive polymer (trade name "Denatron": manufactured by Nagase ChemteX Corporation, trade name "Orgacon LBS": manufactured by Agfa-Gevaert Group.).

These electrically-conductive materials can be used alone or in combination of two or more.

The above-described components (an oxazoline group-containing polymer and/or an electrically-conductive material) are dissolved or dispersed in a solvent and are prepared as a solution or a dispersion liquid of the components.

Preferably, in view of preventing change of properties of the optical film, an aqueous solution or an aqueous dispersion (hereinafter, these are simply collectively referred to as a "coating liquid") in which the components are dissolved or dispersed in water is prepared.

In the coating liquid, in addition to water, alcohols, as an aqueous solvent, can be further contained.

Examples of the alcohols include methanol, ethanol, n-propanol, isopropanol, n-butanol, isobutanol, sec-butanol, tert-butanol, n-amyl alcohol, isoamyl alcohol, sec-amyl alcohol, tert-amyl alcohol, 1-ethyl-1-propanol, 2-ethyl-1-butanol, n-hexanol, and cyclohexanol.

In the coating liquid, the mixing ratio of each of the oxazoline group-containing polymer and the electrically-conductive material is, for example, 0.05 to 80 weight %, or preferably 0.1 to 50 weight %.

In order to provide the primer layer 12, for example, the above-described coating liquid is directly coated to the surface of the optical film 11 by a known coating method such as a wire coating method or a knife coating method to be then dried.

The thickness of the primer layer 12 is, for example, 10 to 1000 nm, or preferably 20 to 500 nm Next, the pressure-sensitive adhesive layer 6 shown in FIG. 1 (c) is attached to the primer layer 12.

Thereafter, when the pressure-sensitive adhesive layer 6 is attached to an adherend, as shown by a phantom line in FIG. 4, the release film 1 is peeled from the pressure-sensitive adhesive layer 6.

In this way, the pressure-sensitive adhesive optical film 10 in which the primer layer 12 and the pressure-sensitive adhesive layer 6 are sequentially laminated on the surface of the optical film 11 can be obtained.

The pressure-sensitive adhesive optical film 10 includes the pressure-sensitive adhesive layer 6 having an excellent appearance, so that the pressure-sensitive adhesive optical film 10 is attached to the surface of an optical device which requires an excellent appearance and an excellent appearance can be ensured in the optical device. An example of the optical device includes an image display device. To be specific, examples thereof include a liquid crystal display (a liquid crystal display device), an organic electroluminescence device (an organic EL display device), an organic light emitting diode (an organic LED, an Organic Light Emitting Diode: OLED), a plasma display panel (PDP), and a cathode ray tube display device (CRT).

The pressure-sensitive adhesive optical film 10 is used as a front panel of the above-described optical device.

The front panel is attached to the front surface (the top surface) of the optical device to be provided, for example, so as to protect the front surface portion of the optical device or to impart a high-quality sense (texture, designability, or the like) to the optical device.

The front panel is, for example, used as a support of a λ/4 wavelength plate in a three-dimensional display device (a three-dimensional image display device including, as it is called, a 3D display device).

To be specific, the front panel is, for example, provided on the surface of the visual recognition side (that is, the front side) with respect to the optical device.

When the pressure-sensitive adhesive optical film 10 is attached to the front surface portion which contains a plastic (a resin) such as polycarbonate and/or an acrylic polymer film (to be specific, polymethylmethacrylate and the like) in the optical device, it has an excellent appearance as in the case of being attached to the front surface portion formed of a material which contains a glass.

In the above-described description, the pressure-sensitive adhesive layer 6 is provided by being transferred to the surface of the primer layer 12. Alternatively, for example, as shown in FIG. 5, the pressure-sensitive adhesive layer 6 can be directly provided on the surface of the primer layer 12.

In order to provide the pressure-sensitive adhesive layer 6 directly on the surface of the primer layer 12, for example, as shown in FIG. 5 (a), first, the optical film 11 in which the primer layer 12 is formed on the surface thereof is prepared. Next, the aqueous dispersion type pressure-sensitive adhesive composition is applied to the surface of the primer layer 12, so that the coating liquid layer 2 is directly formed on the surface of the primer layer 12. Next, as shown in FIG. 5 (c), the coating liquid layer 2 is dried, so that the pressure-sensitive adhesive layer 6 is directly provided on the surface of the primer layer 12.

In this pressure-sensitive adhesive layer 6, the number of the concave portion 5 caused by the foreign object 8 which is present on the surface of the primer layer 12 or the surface of the optical film 11 can be also set to be a desired number or less.

In the above-described pressure-sensitive adhesive optical film 10, the pressure-sensitive adhesive layer 6 is provided on the surface of the optical film 11 via the primer layer 12. Alternatively, for example, though not shown, the pressure-sensitive adhesive layer 6 can be directly provided on the surface of the optical film 11 without providing the primer layer 12.

In the above-described description, the pressure-sensitive adhesive film of the present invention is described as the pressure-sensitive adhesive optical film 10 including the optical film 11. Alternatively, for example, though not shown, the pressure-sensitive adhesive film of the present invention can be formed as a pressure-sensitive adhesive film including a substrate film 11 having mechanical characteristics without having optical characteristics, such as a non-woven fabric, a metal foil (a metal film), or the like.

EXAMPLES

The present invention will now be described in more detail by way of Examples and Comparative Examples. However, the present invention is not limited to the following Examples and Comparative Examples.

Example 1

Preparation of Aqueous Dispersion Type Pressure-Sensitive Adhesive Composition 88 parts by weight of butyl acrylate, 5 parts by weight of acrylic acid, 2 parts by weight of mono[poly(propylene oxide)methacrylate]phosphate ester, and 0.03 parts by weight of 3-methacryloxypropyl-trimethoxysilane (KBM-503, manufactured by Shin-Etsu Chemical Co., Ltd.) were blended, so that a monomer component was prepared.

Next, 46.6 g of a reactive emulsifier (AQUALON HS-10, manufactured by DAI-ICHI KOGYO SEIYAKU CO., LTD.) and 346 g of ion-exchange water were added to 388 g of a part (20 weight % of the total amount of the monomer component) of the prepared monomer component. The obtained mixture was forcibly emulsified (pre-emulsified) for 5 minutes with the number of revolutions of 5000 $min^{-1}$ using a homogenizer, so that a monomer pre-emulsion was prepared.

In a reaction vessel equipped with a condenser tube, a nitrogen introducing tube, a thermometer, and a stirrer, 156 g of the above-described monomer pre-emulsion and 219 g of ion-exchange water were put and then, the atmosphere in the reaction vessel was replaced by nitrogen. Thereafter, 0.023 g of ammonium persulfate was added thereto and the added mixture was emulsion polymerized at 65° C. for 2.5 hours.

Next, 0.217 g of ammonium persulfate was added to 625 g of the remaining monomer component (80 weight % of the total amount of the monomer component) and the obtained mixture was added dropwise into the reaction vessel over 3 hours. After the dropping, the emulsion polymerization was conducted at 70° C. for 3 hours while the atmosphere was replaced with nitrogen, so that an emulsion of an aqueous dispersion type acrylic polymer having a concentration of solid content of 40 weight % was obtained.

Thereafter, the obtained emulsion was cooled to room temperature and a pH was adjusted to be 8 by adding aqueous ammonia of 10 weight %. In addition, 2 parts by weight of SN Thickener 640 (hydrophobic group-modifying polyacrylic acid, manufactured by SAN NOPCO LIMITED) was added to 100 parts by weight of the solid content of the emulsion and ion-exchange water was added thereto to then adjust the concentration of solid content to be 25 weight %, so that an aqueous dispersion type pressure-sensitive adhesive composition was prepared.

(Formation of Pressure-Sensitive Adhesive Layer)

First, a PET film (a release film) which was subjected to a release treatment and has a thickness of 38 µm was prepared (ref: FIG. 1 (a)) and next, the above-described aqueous dispersion type pressure-sensitive adhesive composition was uniformly applied to the surface (the treated side) of the PET sheet using a comma coater, so that a coating liquid layer having a thickness of 92 µm was formed (ref: FIG. 1 (b)).

Thereafter, the formed coating liquid layer was heated at 120° C. for 2 minutes to be dried, so that a pressure-sensitive adhesive layer having a thickness of 23 µm was formed (ref: FIG. 1 (c)).

(Fabrication of Pressure-Sensitive Adhesive Optical Film)

First, a polarizing film on which a primer layer was laminated was prepared (ref: FIG. 5 (a)).

That is, a mixed solution of water/isopropyl alcohol (3:1 by weight ratio) was added to 400 parts by weight (100 parts by weight by solid content conversion) of EPOCROS WS-700 (an aqueous solution type, a solid content of 25%, the main chain: acrylic, a pH of 7 to 9, an oxazoline value of 220 g solid/eq., manufactured by NIPPON SHOKUBAI CO., LTD.) and 30 parts by weight of Orgacon LBS (an electrically-conductive polythiophene, manufactured by Agfa-Gevaert Group.) to be uniformly stirred and the concentration of solid content was adjusted to be 0.5 weight %, so that a coating liquid of a priming agent was prepared. The coating liquid was applied to the surface of the polarizing film having a thickness of 180 µm so as to have a thickness of 20 to 30 nm after drying using a wire bar No. 5 to be thereafter dried. In this way, the polarizing film on which the primer layer was laminated was fabricated.

Thereafter, the pressure-sensitive adhesive layer was attached to the primer layer, so that a pressure-sensitive adhesive optical film was obtained (ref: FIG. 4).

Example 2

An aqueous dispersion type pressure-sensitive adhesive composition was prepared in the same manner as in Example 1, except that the number of blended parts of SN Thickener 640 (hydrophobic group-modifying polyacrylic acid) with respect to 100 parts by weight of the solid content of the emulsion was changed to 1 parts by weight and furthermore, the concentration of solid content of the aqueous dispersion type pressure-sensitive adhesive composition adjusted by adding of ion-exchange water was changed to 30 weight %. Subsequently, a coating liquid layer having a thickness of 77 µm was formed, then, a coating liquid layer having a thickness of 23 µm was formed, and thereafter, a pressure-sensitive adhesive layer and a pressure-sensitive adhesive optical film including the pressure-sensitive adhesive layer were obtained.

Example 3

An aqueous dispersion type pressure-sensitive adhesive composition was prepared in the same manner as in Example 1, except that Aron B-500 (an acrylic acid-based copolymer, manufactured by TOAGOSEI CO., LTD.) was added instead of SN Thickener 640 (hydrophobic group-modifying polyacrylic acid) and the number of blended parts of Aron B-500 with respect to 100 parts by weight of the solid content of the emulsion was changed to 2.6 parts by weight. Subsequently, a coating liquid layer having a thickness of 92 µm was formed and thereafter, a pressure-sensitive adhesive layer having a thickness of 23 µm and a pressure-sensitive adhesive optical film including the pressure-sensitive adhesive layer were obtained.

Example 4

An aqueous dispersion type pressure-sensitive adhesive composition was prepared in the same manner as in Example 1, except that Aron B-500 (an acrylic acid-based copolymer) was added instead of SN Thickener 640 (hydrophobic group-modifying polyacrylic acid); the number of blended parts of Aron B-500 with respect to 100 parts by weight of the solid content of the emulsion was changed to 2 parts by weight; and furthermore, the concentration of solid content of the aqueous dispersion type pressure-sensitive adhesive composition adjusted by adding of ion-exchange water was changed to 30 weight %. Subsequently, a coating liquid layer having a thickness of 77 μm was formed and thereafter, a pressure-sensitive adhesive layer having a thickness of 23 μnm and a pressure-sensitive adhesive optical film including the pressure-sensitive adhesive layer were obtained.

Example 5

An aqueous dispersion type pressure-sensitive adhesive composition was prepared in the same manner as in Example 1, except that ADEKANOL UH-541VF (a urethane thickener, manufactured by ADEKA CORPORATION) was added instead of SN Thickener 640 (hydrophobic group-modifying polyacrylic acid); the number of blended parts of ADEKANOL UH-541VF with respect to 100 parts by weight of the solid content of the emulsion was changed to 2 parts by weight; and furthermore, the concentration of solid content of the aqueous dispersion type pressure-sensitive adhesive composition adjusted by adding of ion-exchange water was changed to 30 weight %. Subsequently, a coating liquid layer having a thickness of 77 μnm was formed and thereafter, a pressure-sensitive adhesive layer having a thickness of 23 μm and a pressure-sensitive adhesive optical film including the pressure-sensitive adhesive layer were obtained.

Comparative Example 1

An aqueous dispersion type pressure-sensitive adhesive composition having a concentration of solid content of 40 weight % was prepared in the same manner as in Example 1, except that SN Thickener 640 (hydrophobic group-modifying polyacrylic acid) was not added and the adjustment (dilution) of the concentration of solid content of the aqueous dispersion type pressure-sensitive adhesive composition by adding of ion-exchange water was not performed. Subsequently, a coating liquid layer having a thickness of 58 μnm was formed and thereafter, a pressure-sensitive adhesive layer having a thickness of 23 μnm and a pressure-sensitive adhesive optical film including the pressure-sensitive adhesive layer were obtained.

Comparative Example 2

An aqueous dispersion type pressure-sensitive adhesive composition was prepared in the same manner as in Example 1, except that SN Thickener 640 (hydrophobic group-modifying polyacrylic acid) was not added.
Next, the formation of a pressure-sensitive adhesive layer was attempted. However, a repelling of the aqueous dispersion type pressure-sensitive adhesive composition occurred on a PET film at the time of application, so that a coating liquid layer and a pressure-sensitive adhesive layer were not capable of being formed.

Comparative Example 3

An aqueous dispersion type pressure-sensitive adhesive composition was prepared in the same manner as in Example 1, except that the number of blended parts of SN Thickener 640 (hydrophobic group-modifying polyacrylic acid) with respect to 100 parts by weight of the solid content of the emulsion was changed to 0.5 parts by weight and furthermore, the concentration of solid content of the aqueous dispersion type pressure-sensitive adhesive composition adjusted by adding of ion-exchange water was changed to 35 weight %. Subsequently, a coating liquid layer having a thickness of 66 μnm was formed and thereafter, a pressure-sensitive adhesive layer having a thickness of 23 μnm and a pressure-sensitive adhesive optical film including the pressure-sensitive adhesive layer were obtained.

(Evaluation)
(1) Observation of Appearance

The pressure-sensitive adhesive layers of the pressure-sensitive adhesive optical films in Examples 1 to 5, and Comparative Examples 1 and 3 were observed visually from the PET film side, so that a presence or absence of a concave portion defined by the description above was observed and the number of the concave portion per 1 $m^2$ was counted. The results are shown in Table 1.

That is, in Examples 1 to 5, the presence of the concave portion was not observed at all or even when it was observed, a depth (D) in the thickness direction of the concave portion was below 0.2 μm and an inner diameter (L) of the upper end thereof was below 1 mm (that is, the concave portion which was smaller than the definition described above).

On the other hand, in both of Comparative Examples 1 and 3, the presence of the concave portion was observed, and the depth (D) in the thickness direction of the concave portion was 0.2 to 20 μm and the inner diameter (L) of the upper end thereof was 1 to 10 mm (that is, the concave portion as it was defined in the description above).

The size of the concave portion was measured with a non-contact three-dimensional surface shape and roughness measuring machine (Wyko NT9100, manufactured by Veeco Instruments Inc.).

(2) Viscosity of Aqueous Dispersion Type Pressure-Sensitive Adhesive Composition The viscosity of the aqueous dispersion type pressure-sensitive adhesive compositions in Examples 1 to 5 and Comparative Examples 1 to 3 at 30° C. and a shear rate of 1 $sec^{-1}$ was measured with a corn plate type viscometer (RheoStress RS-1, manufactured by Gebrueder Haake GmbH.). The results are shown in Table 1.

(3) Turbidity of Thickener

The thickeners used in Examples 1 to 5 and Comparative Example 3 were blended in water to prepare an aqueous solution of 1 weight % and furthermore, a pH thereof was adjusted to be 8 by aqueous ammonia, so that a thickener aqueous solution was prepared. Next, the turbidity of the prepared thickener aqueous solution was measured with a turbidimeter (LaMotte 2020, manufactured by ORGANO CORPORATION). The results are shown in Table 1.

(4) Haze Value

The pressure-sensitive adhesive layers each having a thickness of 23 μm obtained in "Formation of Pressure-Sensitive Adhesive Layer" in Examples 1 to 5, and Comparative Examples 1 and 3 were transferred to slide glass plates (Micro Slide Glass, a thickness of 1.3 mm, manufactured by Matsunami Glass Ind., Ltd.) and the haze value of the pressure-sensitive adhesive layers were measured in conformity with JIS K7136 with a haze mater (HM-150, manufactured by MURAKAMI COLOR RESEARCH LABORATORY CO., Ltd.). The results are shown in Table 1.

(5) Observation of TEM Image

The surfaces of the pressure-sensitive adhesive layers in Examples 1 and 3 were observed with a TEM (a transmission electron microscope). The processed TEM images of the pressure-sensitive adhesive layers of Examples 1 and 3 are shown in FIGS. 6 and 7, respectively.

As shown in FIG. 6, a thickener (SN Thickener 640) which is used in Example 1 and has the above-described turbidity of not more than 100 NTU is uniformly dispersed in an aqueous dispersion type polymer.

On the other hand, as shown in FIG. 7, a thickener (Aron B-500) which is used in Example 3 and has the above-described turbidity of more than 100 NTU remains, as particles, that is, as relatively large insoluble substances (particles), in an aqueous dispersion type polymer.

TABLE 1

| | | | | | Ex. 1 | Ex. 2 | Ex. 3 | Ex. 4 | Ex. 5 | Comp. Ex. 1 | Comp. Ex. 2 | Comp. Ex. 3 |
|---|---|---|---|---|---|---|---|---|---|---|---|---|
| Aqueous Dispersion Type Pressure-Sensitive Adhesive Composition | Thickener | Polyacrylic Acid-Based | Number of Blended Parts (VS 100 Parts of Solid Content of Aqueous Dispersion Type Acrylic Polymer) | SN Thickener 640*1 | 2 | 1 | — | — | — | — | — | 0.5 |
| | | | | Aron B-500*2 | — | — | 26 | 2 | — | — | — | — |
| | | Urethane-Based | | ADEKANOL UH-541VF*3 | — | — | — | — | 2 | — | — | — |
| | | Turbidity (1 wt % Thickener Aqueous Solution, pH 8) | | (NTU*4) | 0.10 | | 100 | | 0.10 | — | — | 0.10 |
| | | Concentration of Solid Content (wt %) | | | 25 | 30 | 25 | 30 | 30 | 40 | 25 | 35 |
| | | Viscosity (30° C., Shear Rate of 1 sec$^{-1}$) (Pa·s) | | | 1.8 | 1.3 | 2.0 | 4.5 | 1.1 | 1.8 | 0.03 | 3.3 |
| Coating Liquid Layer | | Thickness (T1) (μm) | | | 92 | 77 | 92 | 77 | 77 | 58 | 92 | 66 |
| | | T2/T1 | | | 0.25 | 0.30 | 0.25 | 0.30 | 0.30 | 0.40 | 0.25 | 0.35 |
| Pressure-Sensitive Adhesive Layer Thickness (T2): 23 μm | Observation of Appearance | | Number of Concave Portion (Piece/1m$^2$) | | 0 | 0 | 0 | 0 | 0 | 48 | (Due to Repelling Coating Liquid Layer And Pressure-Sensitive Adhesive Layer Are Not Obtained) | 20 |
| | Haze Value | | (Thickness of 23 μm) | | 0.7 | 0.7 | 0.8 | 0.8 | 0.7 | 0.7 | | 0.7 |

In Table 1, the thickeners and the units of measurement shown with "*" are given in details in the following.

SN Thickener 640*1: trade name, hydrophobic group-modifying polyacrylic acid, manufactured by SAN NOPCO LIMITED Aron B-500*2: trade name, an acrylic acid-based copolymer, manufactured by TOAGOSEI CO., LTD.

ADEKANOL UH-541VF*3: trade name, a urethane thickener, manufactured by ADEKA CORPORATION NTU*4: a unit of turbidity, Nephelometric Turbidity Unit While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

INDUSTRIAL APPLICABILITY

The pressure-sensitive adhesive layer is used in a pressure-sensitive adhesive film which is widely used in various industrial fields.

The invention claimed is:

1. A pressure-sensitive adhesive layer obtained by applying and drying an aqueous dispersion type pressure-sensitive adhesive composition, wherein on a surface of the pressure-sensitive adhesive layer, the number of a concave portion having a depth in a thickness direction of 0.2 to 20 μm and a maximum length along the surface of 1 to 10 mm is 5 or less per 1 m$^2$, wherein the pressure-sensitive adhesive layer contains an aqueous dispersion type acrylic polymer and a thickener, and wherein the viscosity of the aqueous dispersion type pressure-sensitive adhesive composition at 30° C. and a shear rate of 1 sec$^{-1}$ is 0.1 to 50 Pa·s.

2. The pressure-sensitive adhesive layer according to claim 1, wherein the concentration of solid content of the aqueous dispersion type pressure-sensitive adhesive composition is 5 to 32 weight % and the thickness of the pressure-sensitive adhesive layer is 3 to 100 μm.

3. The pressure-sensitive adhesive layer according to claim 1, wherein the thickener is prepared as an aqueous solution of 1 weight % and furthermore, when a pH of the thickener is adjusted to be 8, the turbidity is 100 NTU or less.

4. A pressure-sensitive adhesive layer obtained by applying and drying an aqueous dispersion type pressure-sensitive adhesive composition, wherein on a surface of the pressure-sensitive adhesive layer, the number of a concave portion having a depth in a thickness direction of 0.2 to 20 μm and a maximum length along the surface of 1 to 10 mm is 5 or less per 1 m², and wherein the haze value of the pressure-sensitive adhesive layer having a thickness of 23 μm is 1.0% or less.

5. A pressure-sensitive adhesive film comprising:

a substrate; and a pressure-sensitive adhesive layer laminated on a surface of the substrate, wherein the pressure-sensitive adhesive layer is obtained by applying and drying an aqueous dispersion type pressure-sensitive adhesive composition, wherein on the surface of the pressure-sensitive adhesive layer, the number of a concave portion having a depth in a thickness direction of 0.2 to 20 μm and a maximum length along the surface of 1 to 10 mm is 5 or less per 1 m², wherein the pressure-sensitive adhesive layer contains an aqueous dispersion type acrylic polymer and a thickener, and wherein the viscosity of the aqueous dispersion type pressure-sensitive adhesive composition at 30° C. and a shear rate of 1 sec$^{-1}$ is 0.1 to 50 Pa·s.

6. The pressure-sensitive adhesive film according to claim 5, wherein the substrate is an optical film.

7. An optical device comprising:

an optical film; and a pressure-sensitive adhesive layer laminated on a surface of the optical film, wherein the pressure-sensitive adhesive layer is obtained by applying and drying an aqueous dispersion type pressure-sensitive adhesive composition, wherein on the surface of the pressure-sensitive adhesive layer, the number of a concave portion having a depth in a thickness direction of 0.2 to 20 μm and a maximum length along the surface of 1 to 10 mm is 5 or less per 1 m², wherein the pressure-sensitive adhesive layer contains an aqueous dispersion type acrylic polymer and a thickener, and wherein the viscosity of the aqueous dispersion type pressure-sensitive adhesive composition at 30° C. and a shear rate of 1 sec$^{-1}$ is 0.1 to 50 Pa·s.

8. A pressure-sensitive adhesive film comprising:

a substrate; and a pressure-sensitive adhesive layer laminated on a surface of the substrate, wherein the pressure-sensitive adhesive layer is obtained by applying and drying an aqueous dispersion type pressure-sensitive adhesive composition, wherein on the surface of the pressure-sensitive adhesive layer, the number of a concave portion having a depth in a thickness direction of 0.2 to 20 μm and a maximum length along the surface of 1 to 10 mm is 5 or less per 1 m², and wherein the haze value of the pressure-sensitive adhesive layer having a thickness of 23 μm is 1.0% or less.

9. An optical device comprising:

an optical film; and a pressure-sensitive adhesive layer laminated on a surface of the optical film, wherein the pressure-sensitive adhesive layer is obtained by applying and drying an aqueous dispersion type pressure-sensitive adhesive composition, wherein on the surface of the pressure-sensitive adhesive layer, the number of a concave portion having a depth in a thickness direction of 0.2 to 20 μm and a maximum length along the surface of 1 to 10 mm is 5 or less per 1 m², and wherein the haze value of the pressure-sensitive adhesive layer having a thickness of 23 μm is 1.0% or less.

* * * * *